United States Patent
Levy et al.

(10) Patent No.: US 6,711,560 B2
(45) Date of Patent: Mar. 23, 2004

(54) METHOD OF EXECUTING CONFLICTING TRIGGERS IN AN ACTIVE DATABASE

(75) Inventors: Eliezer Levy, Haifa (IL); Nitzan Peleg, Haifa (IL); Yuval Sherman, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 423 days.

(21) Appl. No.: 09/823,340

(22) Filed: Mar. 29, 2001

(65) Prior Publication Data

US 2002/0143746 A1 Oct. 3, 2002

(51) Int. Cl.[7] .................................................. G06F 17/30
(52) U.S. Cl. ............................................ 707/1; 707/103
(58) Field of Search ................................ 707/1, 2, 3, 4, 707/5, 6, 7, 8, 9, 10, 100, 103 R; 709/217; 717/141

(56) References Cited

U.S. PATENT DOCUMENTS

| | | | |
|---|---|---|---|
| 5,680,602 A | * 10/1997 | Bloem et al. .................. 707/1 |
| 5,864,842 A | 1/1999 | Pederson et al. ............... 707/3 |
| 5,873,075 A | * 2/1999 | Cochrane et al. .............. 707/2 |
| 5,875,334 A | 2/1999 | Chow et al. ................. 717/141 |
| 5,881,232 A | 3/1999 | Cheng et al. ................ 709/217 |
| 5,884,299 A | 3/1999 | Ramesh et al. ................. 707/2 |
| 5,890,148 A | 3/1999 | Bhargava et al. ............... 707/2 |
| 5,930,795 A | 7/1999 | Chen et al. .................. 707/100 |
| 5,950,188 A | 9/1999 | Wildermuth ................... 707/3 |
| 6,385,603 B1 | * 5/2002 | Chen et al. .................... 707/3 |
| 6,405,212 B1 | * 6/2002 | Samu et al. ............. 707/103 R |
| 6,594,656 B1 | * 7/2003 | Arlein et al. ................... 707/4 |

* cited by examiner

*Primary Examiner*—Diane D. Mizrahi
*Assistant Examiner*—Yicun Wu

(57) ABSTRACT

A method for executing triggers in an active database. An operator tree is formed for the activating trigger and the activated triggers are identified. Each trigger has a creation time stamp. Conflicting triggers are determined based on the tables accessed by the activated triggers. Two or more parallel groups are formed such that conflicting triggers are placed into a different parallel groups and non-conflicting triggers are contained within a parallel group. The parallel groups are interconnected for sequential execution, the order of execution of the parallel groups being based on the creation time stamps of conflicting triggers. The parallel groups are then connected to the operator tree and, if possible, a parallel group containing row triggers is connected to execute in a pipelined fashion with the operator tree of the activating statement.

17 Claims, 18 Drawing Sheets

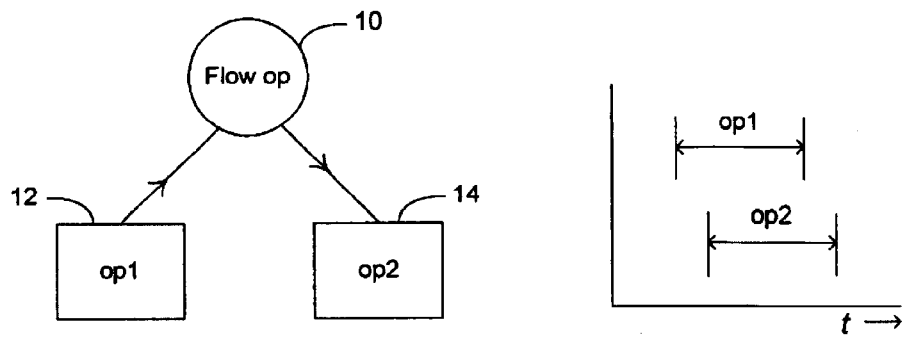
Fig. 2A
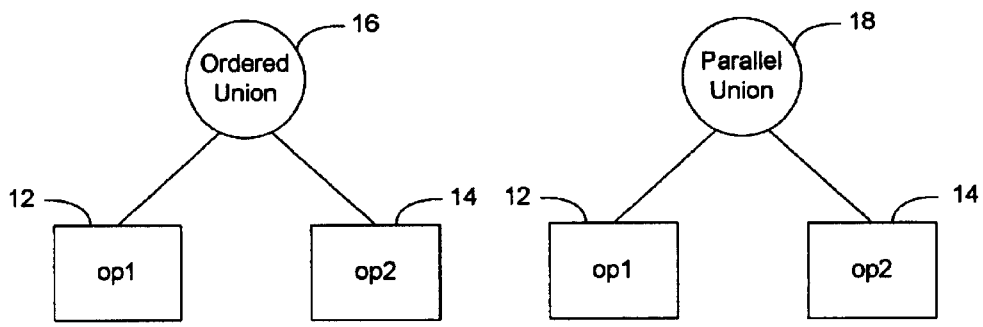
Fig. 2B                    Fig. 2C

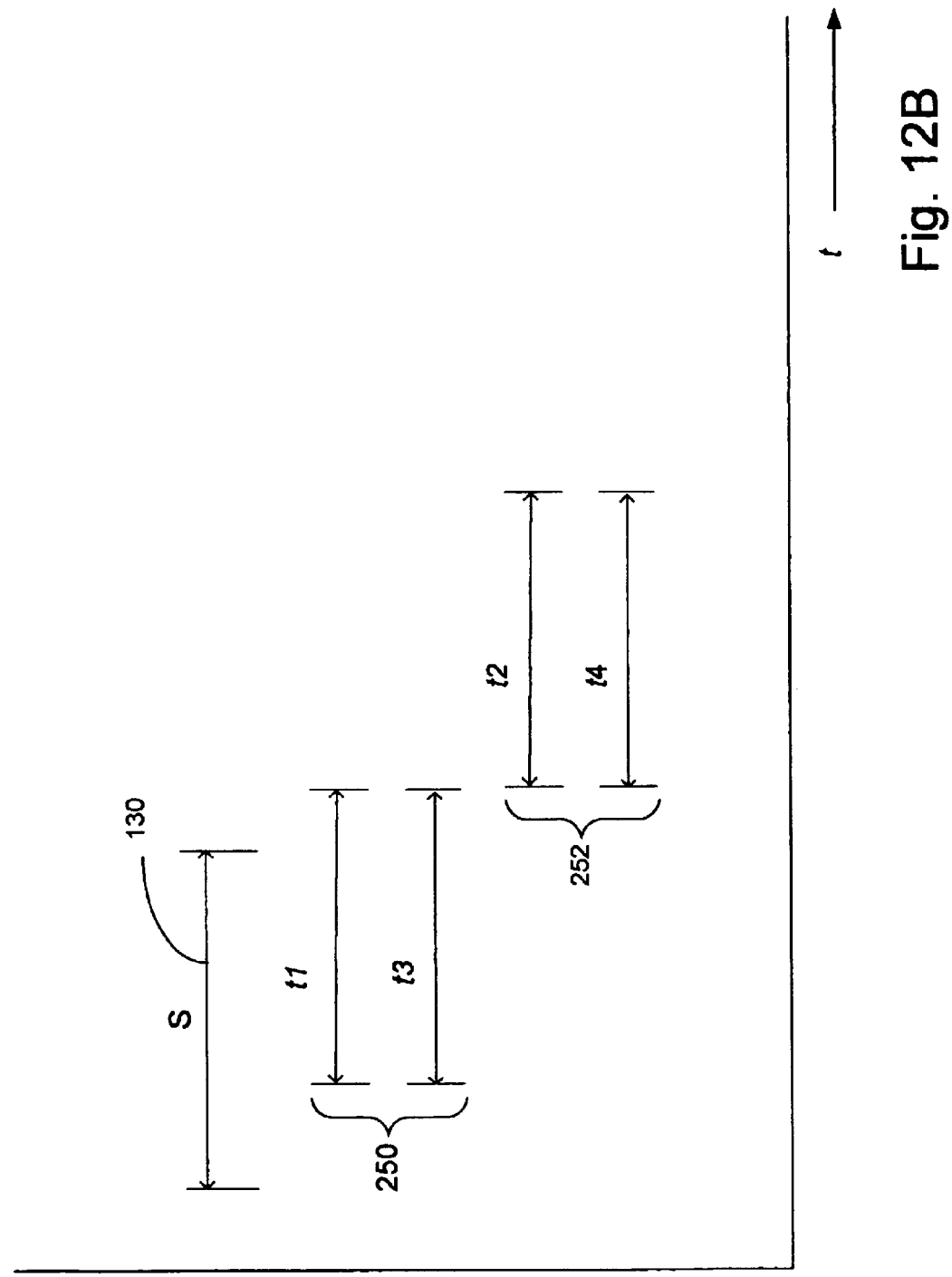

METHOD OF EXECUTING CONFLICTING TRIGGERS IN AN ACTIVE DATABASE

CROSS-REFERENCE TO RELATED APPLICATIONS

This application is related to U.S. application entitled "A METHOD OF PARALLEL TRIGGER EXECUTION IN AN ACTIVE DATABASE", Ser. No. 09/523,337, filed on Mar. 29, 2001 and U.S. application entitled "A METHOD OF EXECUTING BEFORE-TRIGGERS IN AN ACTIVE DATABASE", Ser. No. 09/822,996, filed on Mar. 29, 2001.

FIELD OF THE INVENTION

The present invention relates generally to executing triggers in active relational databases and more specifically to the concurrent execution of triggers in a relational data base management system.

DESCRIPTION OF THE RELATED ART

Database management systems (DBMS) 11, such as the system shown in FIG. 1, have become the dominant means of keeping track of data, especially for servers connected to the Internet. These systems take an organized approach to the storage of data by imposing a data model, typically a relational data model, on the data 17 that is stored in the database 15. Included in the typical DBMS are a Query Processing Engine 13, a File Access and Storage Management subsystem 21 for accessing the database 15, a Concurrency Control subsystem 19 for managing locks needed for concurrency on database items (tables and rows) and a Recovery Control Subsystem 23 for restoring the DBMS 23 to a consistent state after a fatal error. The latter two subsystems 19, 23, are interconnected with the File Access and Storage Management subsystem 21.

In the relational data model, data is stored as a relation, which has two aspects, the relation schema and the relation instance. The relation schema specifies the relation's name, and the name and domain of each column in the relation. The relation instance is a set of records (also called rows or tuples) that conform to the relation schema. A relation instance is therefore a table of records, each of which has a column that meets the domain constraints imposed by the schema.

Not only does the DBMS impose a constraint on storage of data, a DBMS usually formalizes the means by which information may be requested from the database. In particular, a query language is specified by which questions may be put to the database. The language is usually based on a formal logic structure such as relational algebra or calculus. Queries are usually carried out in the DBMS 11 by a Query Processing Engine 13, which has a number of components for parsing a query, creating a query plan, and evaluating the query plan. In particular, a component of the Query Processing Engine 13, a Query Optimizer, creates one or more query plans, each in the form of a tree of relational operators, that are evaluated for execution of the query based on some efficiency metric.

Relational operators take one or more tables as inputs and generate a new table as the output. For example, a selection operator selects one or more rows of an input table meeting the selection criteria to produce an output table having only those rows. Operators can be composed since an operator may take as input a table generated as the output of another operator. A tree of operators is the representation of a composition of the relational operators appearing as the nodes of the tree.

A tree of such operators for a particular query plan is shown in FIG. 3. As can be observed from the tree of FIG. 3, relational operators are connected to each other and to base tables T1 and T2 by means of queues Q1–Q4. These queues supply input rows to a particular operator and store output rows from the operator. The queues allow an operator to start processing rows as soon as the operator that supplies the rows begins to produce them and before all rows are produced. Such pipelining improves the efficiency of the system because intermediate results need not be stored in a temporary table and then read again for input.

The standard language for implementing a DBMS is the Structured Query Language (SQL). This language includes Triggers, which are actions executed by the DMBS under certain conditions.

A database having a set of triggers is called an active database and each trigger in the database has three parts, an event, a condition and an action. The event part is a change to the database, such as an insertion, deletion, or modification of a table, that activates the trigger. The SQL statement which is the activating event, is termed the activating statement. A condition is a test by the activated trigger to determine whether the trigger action should occur and an action is an SQL statement that is executed if the trigger event and trigger condition are both satisfied. The set of rows affected (i.e., inserted, updated, or deleted) by the activating statement is termed the affected set of rows for the relevant trigger.

The action part of the trigger can occur either before or after the activating statement. If before, it is called a before-trigger and if after, it is called an after-trigger. In addition, triggers can operate at the row level or the statement level. A statement trigger executes its action once per activating statement and a row trigger executes its action for each row in the affected set. The combination of "before" and "after" with "row" and "statement" creates four different types of triggers. Chain reactions of trigger actions and recursive trigger actions are also possible.

The execution of triggers in a relational database is governed by the proposed ANSI standard for SQL (SQL:1999) which places certain restrictions on trigger execution. A chief restriction is that the triggers be executed serially in their creation time order or at least that the serial execution of triggers be equivalent in outcome and effect on the database to the execution of triggers in their creation time order. In addition, some triggers, which are activated by an activating statement, may affect overlapping sets of affected rows, thereby leading to an access conflicts among the activated triggers. While the serial execution of these triggers is in accordance with the proposed ANSI:99 standard, such execution would seriously affect the performance of the DMBS, especially if many trigger actions are involved.

Thus, there is a need for the improved execution of multiple trigger actions including conflicting triggers which leads to improved performance of trigger actions over a purely sequential execution, but still conforms to the ANSI standard.

BRIEF SUMMARY OF THE INVENTION

The present invention is directed towards the above mentioned needs. A method, in accordance with the present invention, of forming an execution plan for a plurality of trigger actions in an active database includes the following steps. First, the plurality of triggers that are activated by the activating statement is identified. Next, an operator tree for the activating statement and a tree for each trigger of the plurality of activated triggers are formed, where the activated triggers are after-triggers and each has a time stamp to mark the time at which it was created. The tables that are accessed by the plurality of activated triggers are determined and, based on those tables, conflicting triggers are determined. Assuming there are conflicting triggers, the activated triggers are then separated into at least two parallel groups, a first group and a second group, where each group contains at least one trigger that conflicts with at least one trigger in another group. The parallel groups of triggers are then interconnected to the operator tree for the activating statement such triggers that can execute in parallel do so and those having conflicts with other triggers execute in the order of their creation time stamp. The row triggers of the first parallel group are interconnected for pipelined execution with the activating statement.

An advantage of the present invention is that groups of triggers having no data access conflicts are executed in parallel.

Another advantage is that row after-triggers of the first parallel group are executed substantially in parallel with the execution of the operators of the activating statement.

Another advantage is that statement after-triggers are executed in parallel.

BRIEF DESCRIPTION OF THE DRAWINGS

These and other features, aspects and advantages of the present invention will become better understood with regard to the following description, appended claims, and accompanying drawings where:

FIG. 2A illustrates a Flow operator;

FIG. 2B illustrates an Ordered Union Operator;

FIG. 2C illustrates a Parallel Union Operator;

FIG. 12B shows a timing chart for the plan of FIG. 12A.

DETAILED DESCRIPTION OF THE INVENTION

The present invention relies on a number of operators to control the execution of operations in both an activating statement and its associated trigger trees. The first of these operators is illustrated in FIG. 2A which shows a Flow Operator. The function of this operator is to move the output of operator op1 12 to the input of operator op2 14, as the output of operator op1 is produced. For example, if op1 is a selection operator on a table which selects rows of the table meeting a certain condition, then as the rows meeting the condition are found, say by scanning the table, the rows are sent to the input of op2. This permits the op2 operator to function in parallel to the op1 operator, though, of course, not on the same row that op1 is operating on. FIG. 2A illustrates this "pipelining" operation in a timing chart which shows the activity of op1 overlapped with the activity of op2.

FIGS. 2B and 2C illustrate the Union Operators. The Ordered Union operator 16 of FIG. 2B forces op2 to operate only after op1 has completed its operations, in effect serializing the op1, op2 operations as shown in the timing chart. The Parallel Union operator 18 allows op2 to operate concurrently with op1, and assumes that op2 has no data access conflict with op1. As is evident from FIGS. 2A and 2C, the flow operator 10 and the parallel union operator 18 reduce the time to carry out the functions of the op1 and op2 operators compared to the ordered union operator 16.

Figure 1:
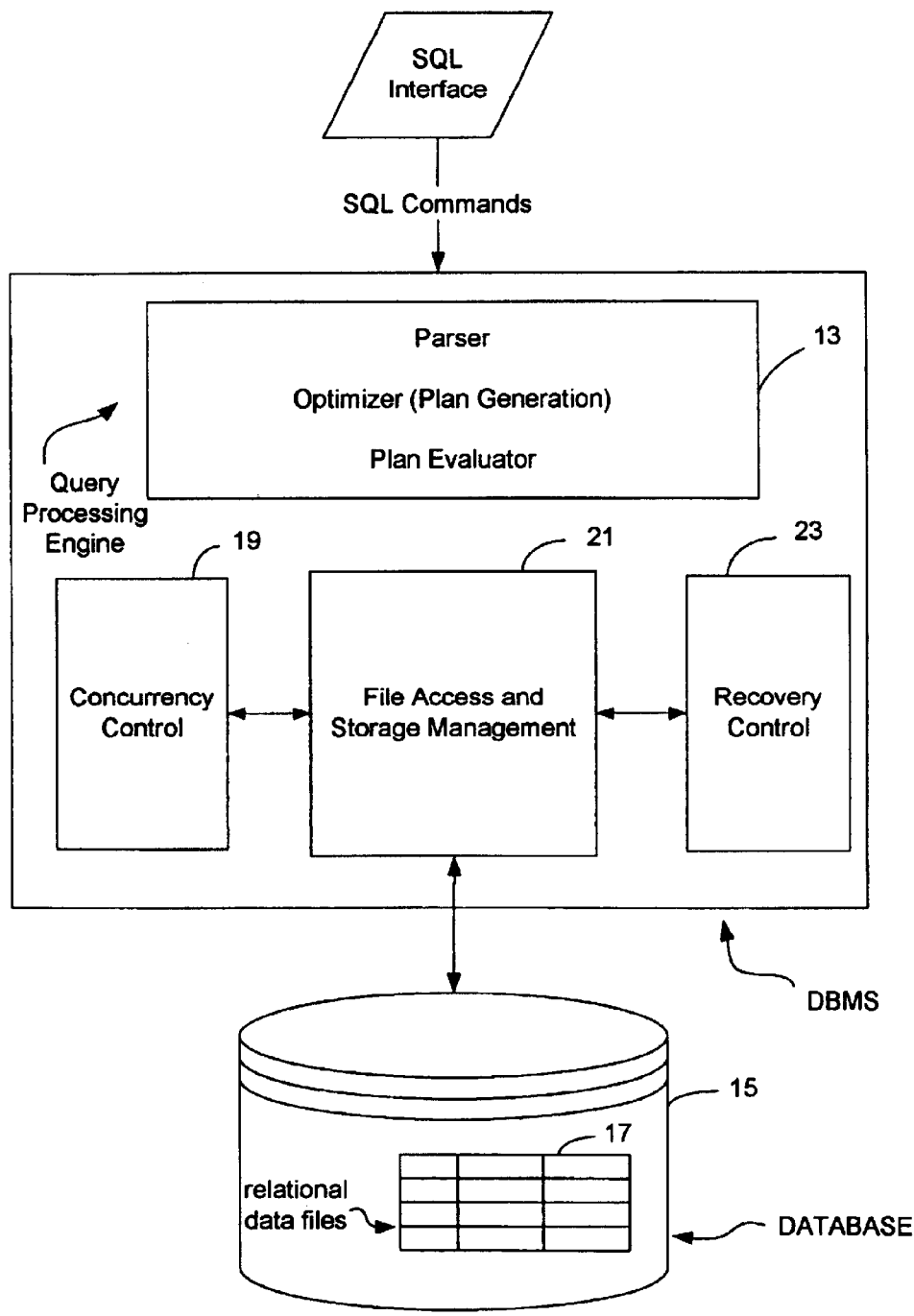
FIG. 1 illustrates a typical database management system.
Figure 3:
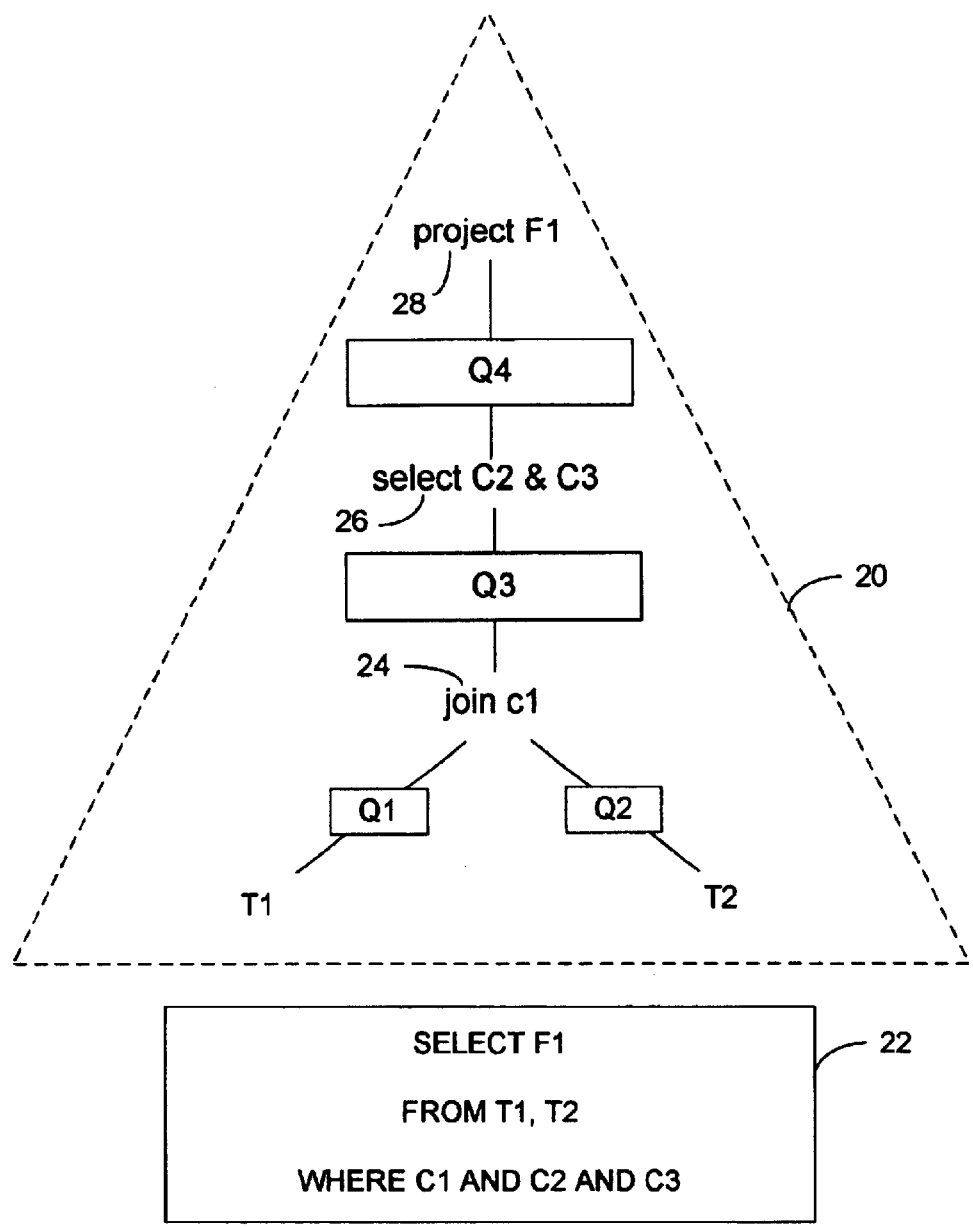
FIG. 3 shows an operator tree for a statement.

Referring to FIG. 3, an operator tree 20 is shown for the given SQL statement 22. The SQL statement 22 projects a desired column F1 from the table created by joining tables T1, T2 and selecting the rows that meet the conjunction of conditions C1, C2 and C3. The operator tree 20 shows one way of implementing the SQL statement 22. According to the tree, first T1 and T2 are joined based on condition C1 by the join operator 24. Next, a selection operator 26 selects the rows of the joined table that meet the condition which is the conjunction of C2 and C3. Finally, a projection operator 28 selects the column F1 from any rows that result from the prior operations. As described above, the function of a Query Optimizer is to form alternative execution plans for a query so that the plans can be evaluated in terms of some performance metric. The tree in FIG. 3 is only one such tree that a Query Optimizer can produce for the given SQL statement.

Figure 4:
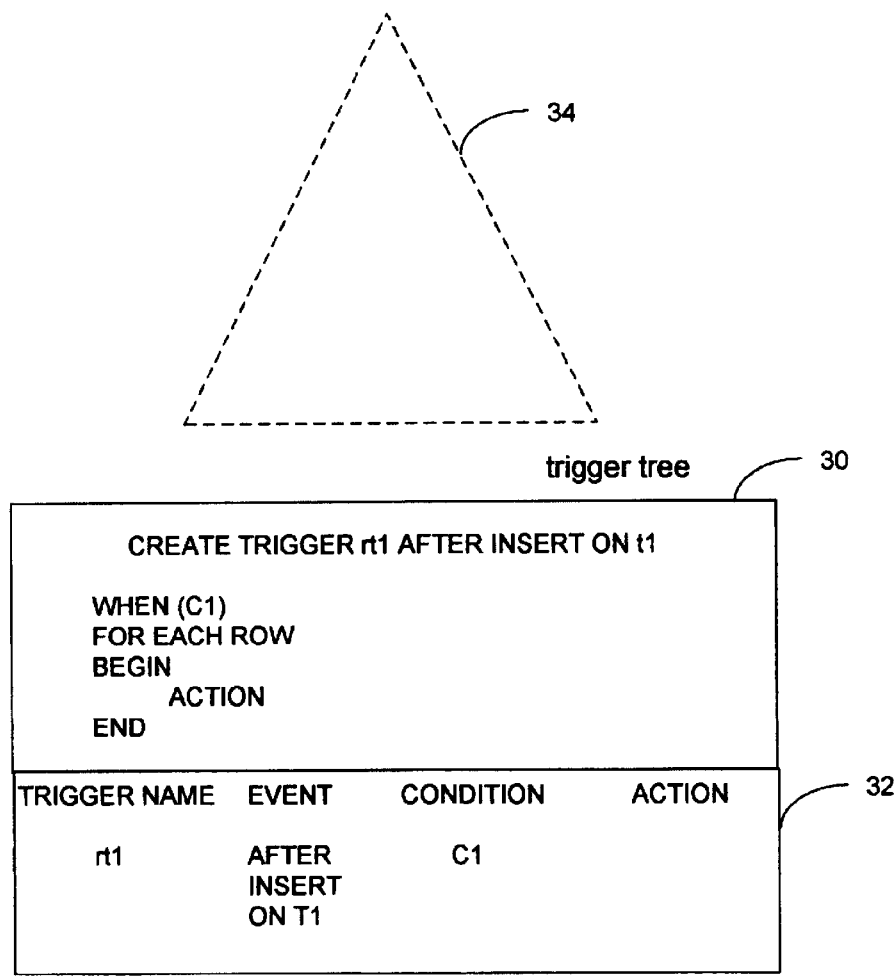
FIG. 4 shows a trigger tree and a representative statement for a trigger.

FIG. 4 shows an SQL statement 30 for a row after-trigger, rt1. The event, condition and action for the trigger are shown in block 32. The event for rt1 is a row insertion into a table T1; the condition is C1, which can be an arbitrary relational condition and the ACTION part of the trigger can be practically any sequence of SQL statements. The trigger tree 34 represents both the condition and the action parts of the trigger.

Figure 5:
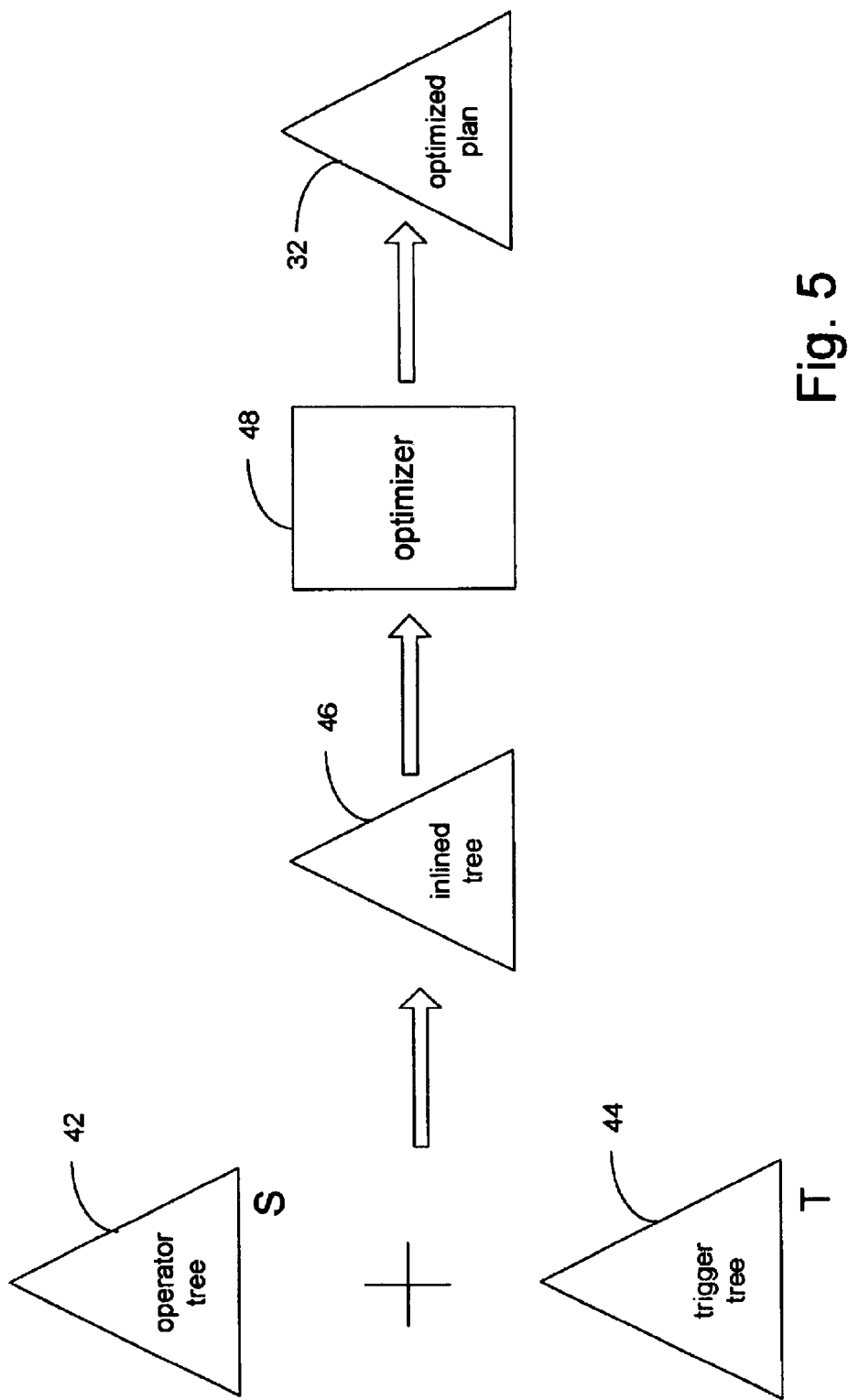
FIG. 5 shows an overview of an aspect of the present invention.

FIG. 5 shows an overview of the present invention. In FIG. 5, an operator tree 42 for an activating statement S is combined, i.e., "inlined," with a trigger tree 44 of a trigger T activated by the statement to create an inlined tree 46. The inlined tree 46 is then processed by an optimizer to create an optimized execution plan 50 for the operators and trigger trees caused by the activating statement S.

Figure 6A:
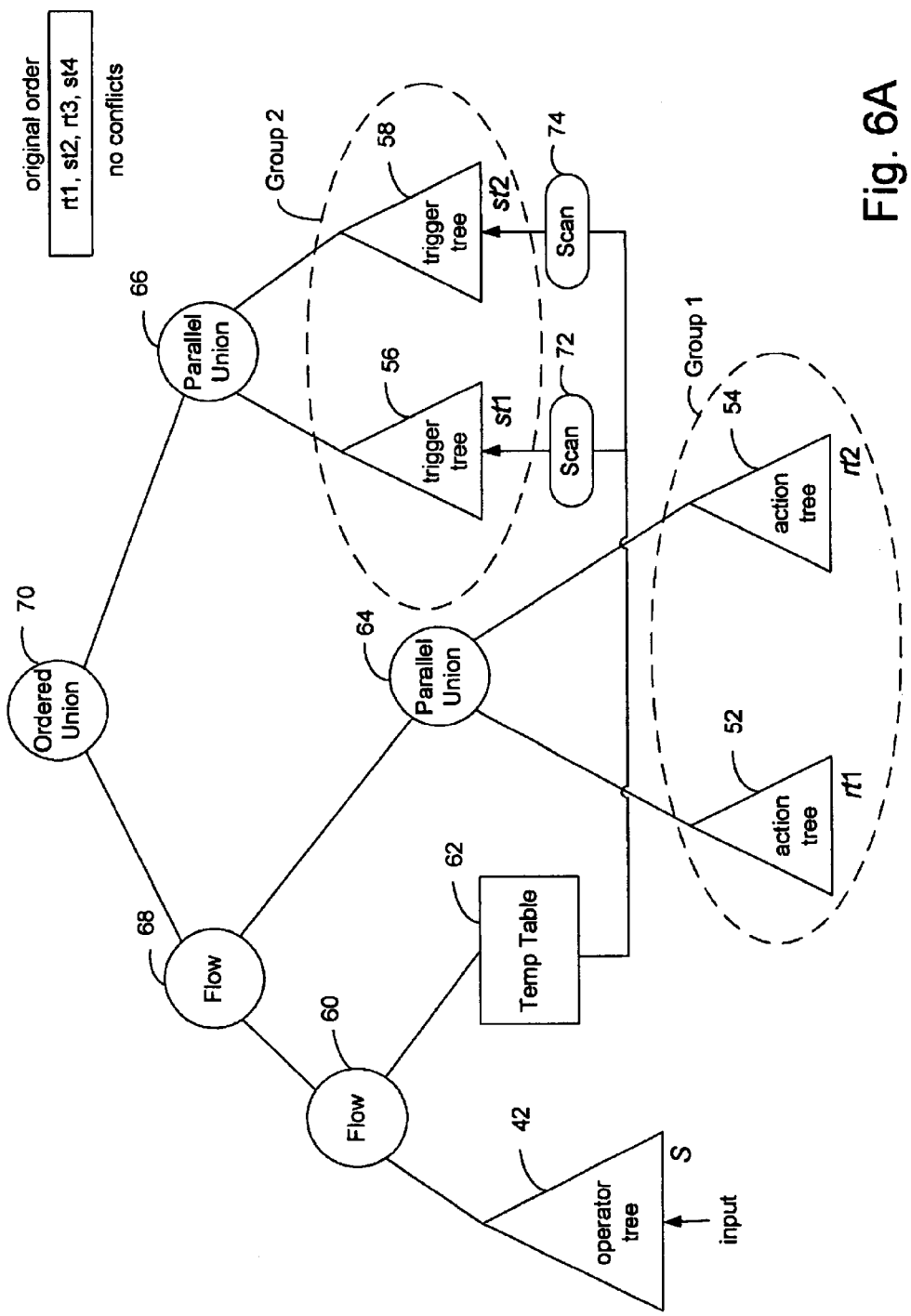
FIG. 6A illustrates a more detailed execution plan when there are no conflicts among triggers.
Figure 6B:
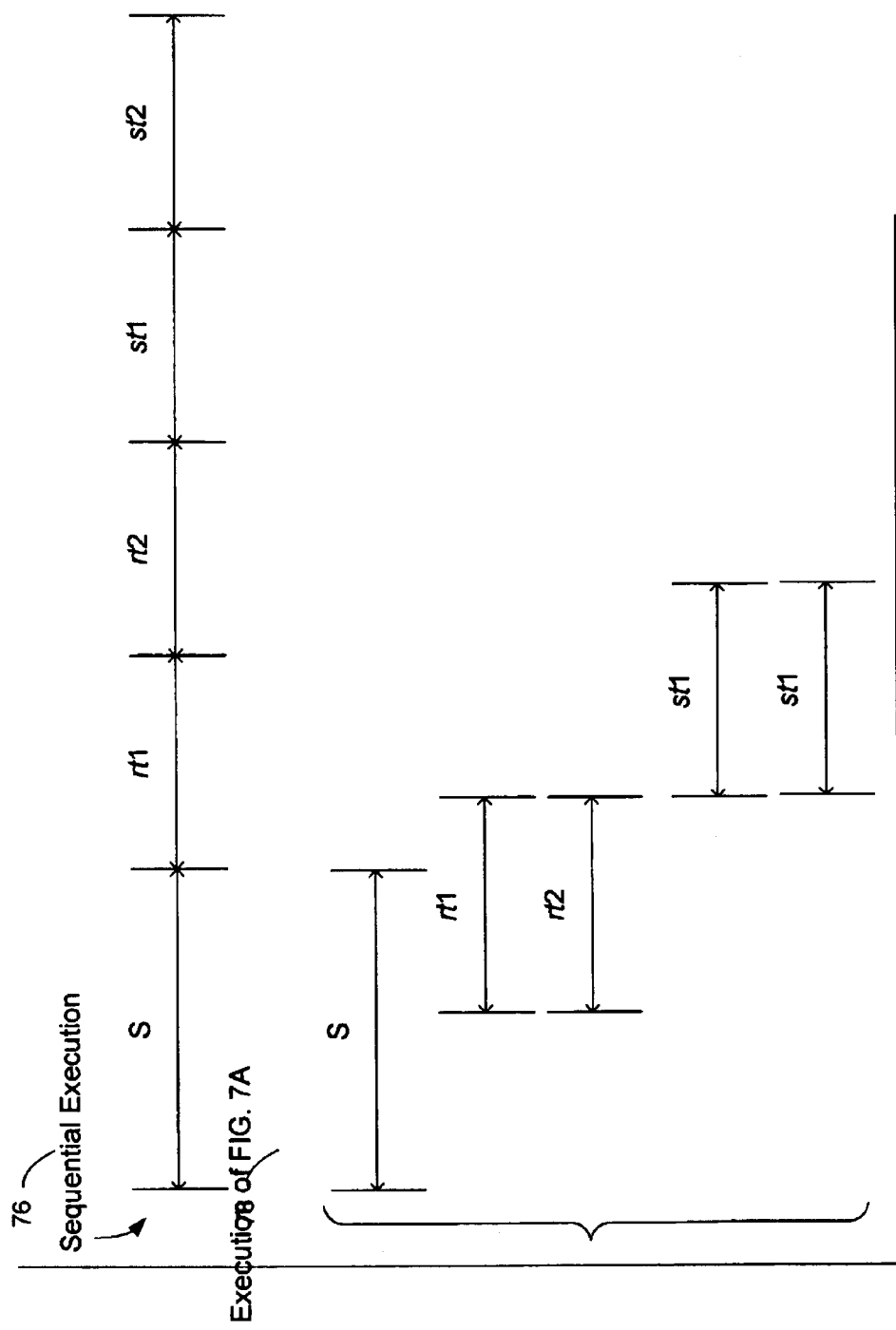
FIG. 6B illustrates a timing chart for the plan of FIG. 6A.

FIG. 6A illustrates a more detailed execution plan formulated in accordance with the present invention illustrated in FIG. 5. In FIGS. 6A and 6B it is assumed that there are no data access conflicts among the activated triggers and between the activated triggers and the activating statement and that all of the activated triggers are after-triggers.

Referring to FIG. 6A, statement S is represented by an operator tree 42, row triggers rt1 and rt2 are represented by trees 52, 54, respectively, and statement triggers st1 and st2 are represented by trees 56 and 58, respectively. It is assumed that statement S is the event that causes activation of the row and statement triggers. In accordance with the present invention, the operator tree 42 produces, as output, the set of affected rows. A flow operator 60 connects the operator tree 42 for statement S to a temporary table, TempTable 62, so that rows that are output by the operator tree 42 are pipelined to the temporary table, TempTable 62. Parallel union operators 64 and 66 connect the trees 52, 54 for rt1 and rt2 and the trees 56, 58 for st1 and st2 so that trees 52 and 54 execute in parallel and trees 56 and 58 execute in parallel.

Another flow operator 68 connects the parallel union operator 64 for rt1 and rt2 to the flow operator 60 connected to the operator tree 42 for statement S so that action trees 52 and 54 execute pipelined to the execution of the statement tree 42. Finally, an ordered union operator 70 connects the flow operator 68 to the parallel union operator 66 for st1 and st2 so that the trees 56 and 58 execute subsequent to the execution of the statement tree 42. The statement trees 56 and 58 receive their inputs by scanning the temporary table, TempTable 62, as represented by the scan functions 72 and 74.

The effect of structure of FIG. 6A is that the row triggers execute in parallel with each other and pipelined with the activating statement and statement triggers execute in parallel with each other but subsequent to the activating statement. Specifically, the structure operates as follows. The operator tree 42 of S operates to generate a stream of affected rows. As the operator tree for S produces the stream of rows, each row is pipelined by the flow operator 60 to the TempTable 62 to prepare for the operation of the statement trigger st1 and st2, which must execute only after statement S is completed. TempTable 62 accumulates the set of affected rows that were produced by the operator tree 42 for S. These changes may need to be made available to the statement trigger trees st1 and st2. Additionally, each row produced by statement S operator tree 42 is pipelined to the row trigger trees rt1 and rt2, which execute in parallel on the pipelined rows. Upon completion of the execution of statement S, and the row triggers rt1 and rt2, the statement triggers st1 and st2 are allowed to execute because of the ordered union operator 70. The statement trigger trees execute in parallel with each other by scanning the TempTable 62 for input data as needed. After the temporary table is used, the contents of the temporary table are deleted by a special delete operator The timing of the execution plan 76 of Statement S, rt1, rt2, st1 and st2, according to the structure of FIG. 6A, is illustrated in FIG. 6B, where S represents the time to execute the statement tree 42, rt1, the time to execute the rt1 action tree 52, rt2 the time to execute the rt2 action tree 54, st1 the time to execute the st1 action tree 56, and st2 the time to execute the st2 action tree 58. As can be noted from the figure, rt1 and rt2 execute in parallel and overlap with the execution of statement S because of pipelining. Statement triggers st1 and st2 execute in parallel but only after the execution of the row triggers. This gives a large decrease in the time to execute the statement S and its associated triggers compared to the case of sequential execution 74 shown in the figure.

Figure 7:
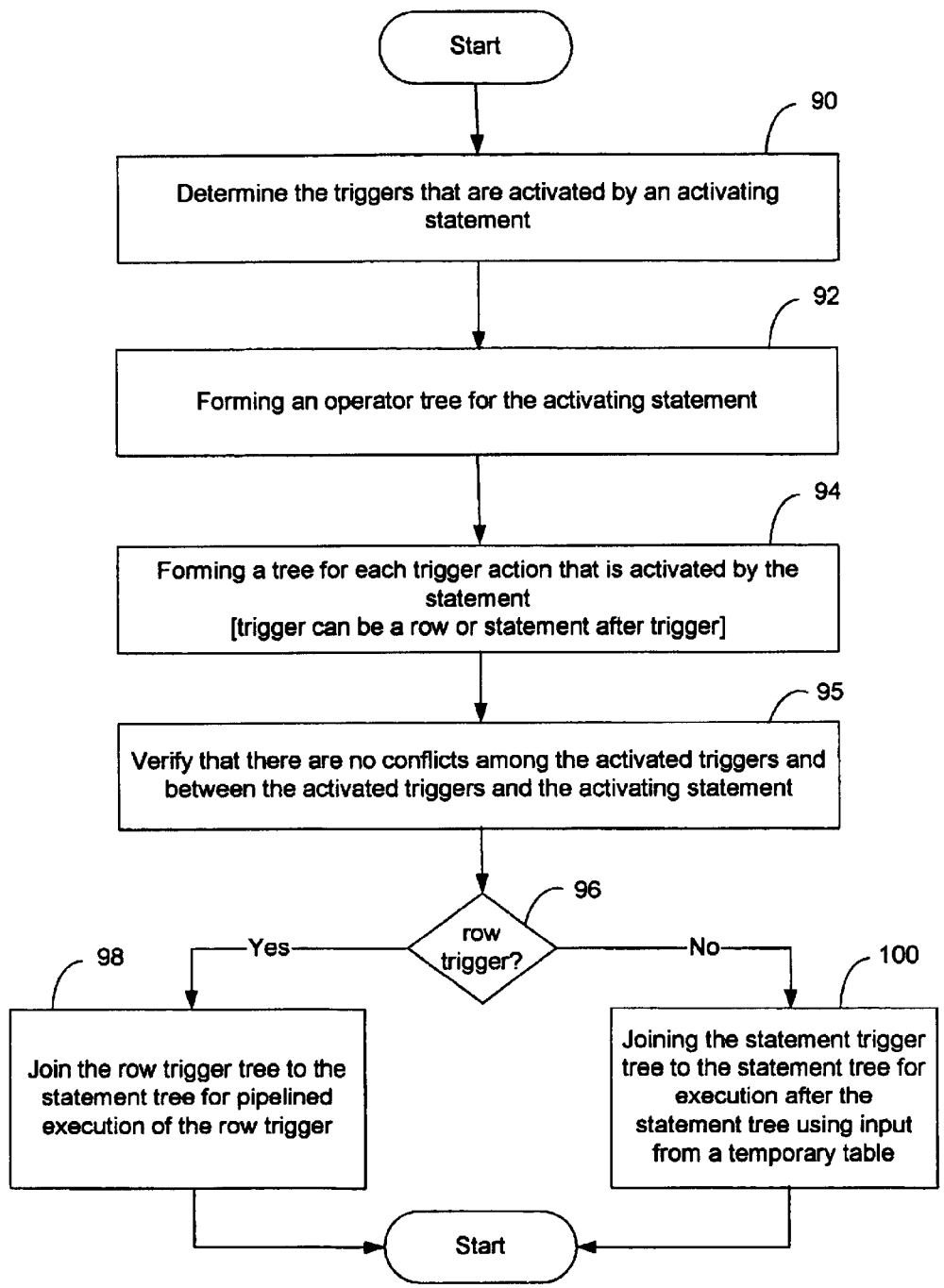
FIG. 7 shows a flow chart for creating an execution plan when there are no conflicts among triggers.

FIG. 7 shows a flow chart of the process for creating an execution plan such as is shown in FIG. 6A. In the process depicted, first the triggers that may be activated by the activating statement are determined in step 90 and an operator tree of the activating statement is formed in step 92. Next, a trigger tree for each of the activated triggers is formed in step 94 and, in step 95, the process then verifies that there are no conflicts among activated triggers and between the activated triggers and the activating statement. An activated trigger is either a row or statement trigger as determined by step 96. If a row trigger is activated, it is joined to the action tree for pipelined execution with the execution of the statement tree in step 98. If a statement trigger is activated, it is joined, in step 100, to the statement tree for execution after the execution of the statement tree using a temporary table as input for the action of the statement trigger. The temporary table accumulates the set of affected rows. The statement trigger scans the temporary table for its input.

The above covers the case where there are no conflicting row triggers or statement triggers. If more than one row or statement trigger is activated by the activating statement, the row or statement triggers must be combined into the execution plan. In particular, if a number of row triggers is activated, the activated row triggers are combined together into a parallel row group (Group 1 in FIG. 6A) and this parallel row group is the object that is attached to the statement tree for pipelined execution. Internal to the parallel group, each trigger is interconnected by means of a parallel union operator to permit parallel execution of each row trigger within the group. Thus, the execution plan according to the present invention prescribes that each trigger in the parallel group executes in parallel with the other triggers in the group and the entire group execute in a pipeline with the activating statement tree.

If a number of statement triggers is activated, the activated statement triggers are combined together into a parallel statement group (Group 2 in FIG. 6A) and this parallel statement group is the object that is attached to the statement tree for execution subsequent to the statement tree. Again, internal to the parallel group, each trigger is interconnected by means of a parallel union operator to permit parallel execution of each statement trigger within the group. Additionally, each statement trigger during its execution typically scans the TempTable 62 for its input. The execution plan thus prescribes that the statement triggers execute in parallel and the entire group executes subsequent to the execution of the activating statement tree.

Of course, it is possible that both a plurality of row triggers and a plurality of statement triggers are activated by the activating statement. This means that the final execution plan combines the actions trees of both the activated statement triggers and row triggers according to FIG. 6A.

The above execution plans are limited to the case in which there are no data access conflicts. If there are data access conflicts, the execution plan must be altered to take these conflicts into account.

Figure 8A:
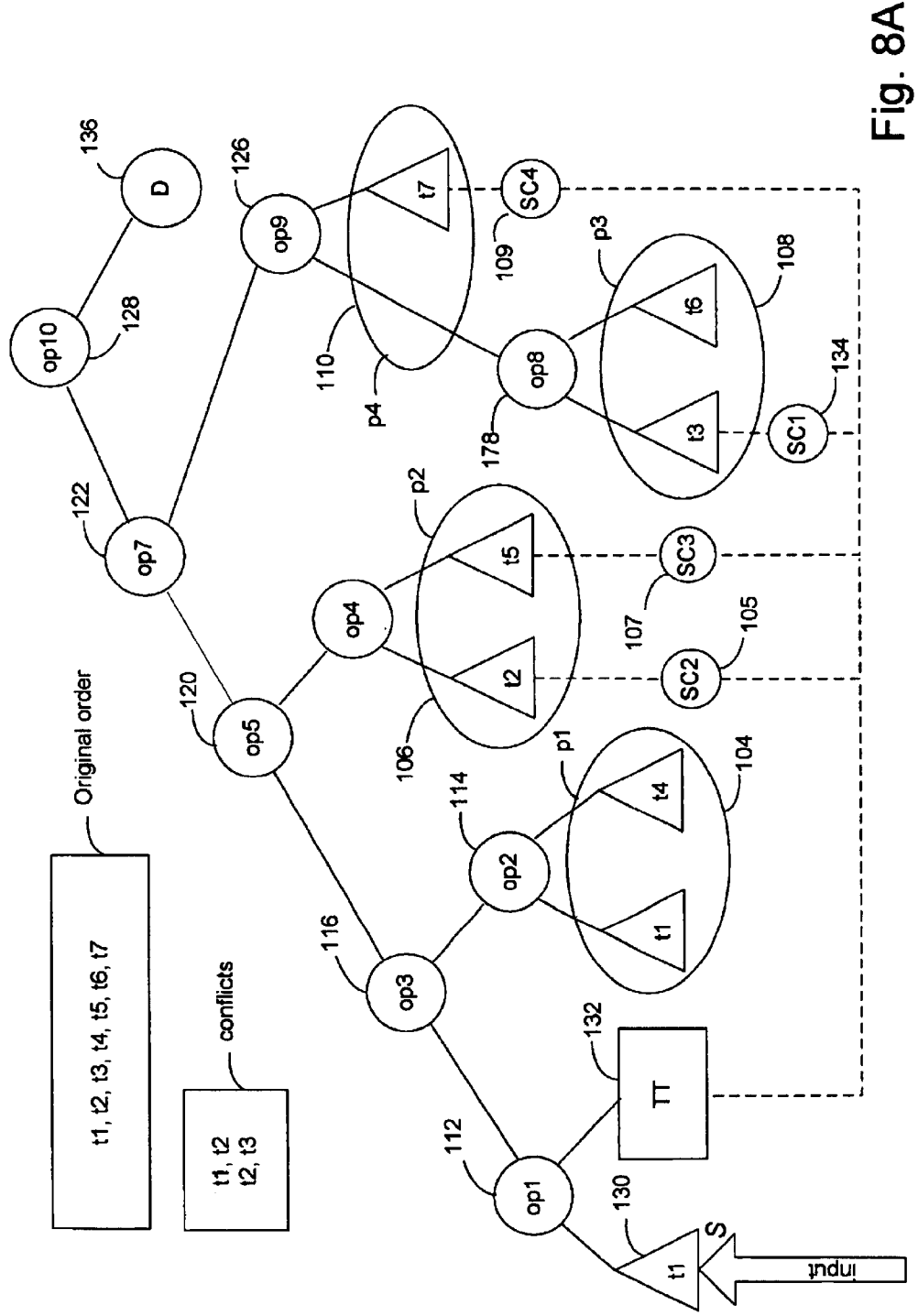
FIG. 8A shows a general execution plan in accordance with the present invention.

FIG. 8A shows a general execution plan in accordance with the present invention. The execution plan has four groups p1 104, p2 106, p3 108 and p4 110, nine operators op1 112, op2 114, op3, 116, op4 118, op5 120, op7 122, op8 124, op9 126, op10 128, an activating statement tree S 130, a temporary table TT 132, scan operators sc1 134 sc2 105, sc3 107 and sc4 109, and a deletion operator D 136. In the figure it is assumed that there are pair-wise conflicts (for purposes of illustration) between t1 and t2, and t2 and t3, and that the order of creation of the triggers is indicated by the trigger subscript.

In FIG. 8A, group p1 has two triggers t1 and t4 that are joined by op2, a parallel union operator that enables parallel execution of triggers t1 and t4. If group p1 is a group of row triggers, the group can execute in a pipelined fashion with the activating statement S and op3 is a flow operator. If group p1 is a group that cannot execute pipelined with the activating statement, then op3 is an ordered union operator. As described above, an ordered union operator prevents execution of the right leg of a tree until execution of the left leg has completed.

Group p2 in FIG. 8A has two triggers t2 and t5 and these triggers are joined by parallel union operator op4 to permit their concurrent execution. Group p2 is joined to the tree by op5, which is an ordered union operator because of the assumed conflict between t1 and t2. Ordered union operator op5 guarantees that group p1 completes execution before the execution of group p2 starts.

Group p3 in FIG. 8A contains two triggers t3 and t6 which are joined by op8, a parallel union operator to permit triggers t3 and t6 to execute in parallel. This group is joined, via op9, an ordered union operator, to group p4, which contains trigger t7. This arrangement, in effect, causes triggers in groups p3 and p4 to execute as if they were a single group. Trigger t7 is connected to execute in parallel with the parallel execution of triggers t3 and t6. Operator op9 is connected to the rest of the tree via op7, an ordered union operator, because of the assumed conflict between t3 and t2. It should be noted that triggers t3 and t6 can be different in type from trigger t7. For example, triggers t3 and t6 can be row triggers and t7 can be a statement trigger. The connections of op8 and op9 thus provide a way of forming hybrid groups, i.e., groups of triggers that are not all of the same type.

Triggers in groups p1, p2, p3 and p4 may need the assistance of a temporary table TT and scan operators, such as sc1–sc4, to have access to rows affected by the activating statement. The execution plan includes scan operators connected to triggers, as needed, to scan the temporary table TT for input. The temporary table is connected via a flow operator op1 to the operator tree of the activating statement so that it accumulates the affected rows in pipelined fashion with the execution of the activating statement. If the group p1 contains row triggers, this group obtains input from the execution of the activating statement without the need of a scan operator. If groups p2 and p4 contain statement triggers (i.e., t2, t5 and t7 are statement triggers), these statement triggers may need to scan the temporary table TT 132 to have access to the rows affected by the activating statement.

Figure 8B:
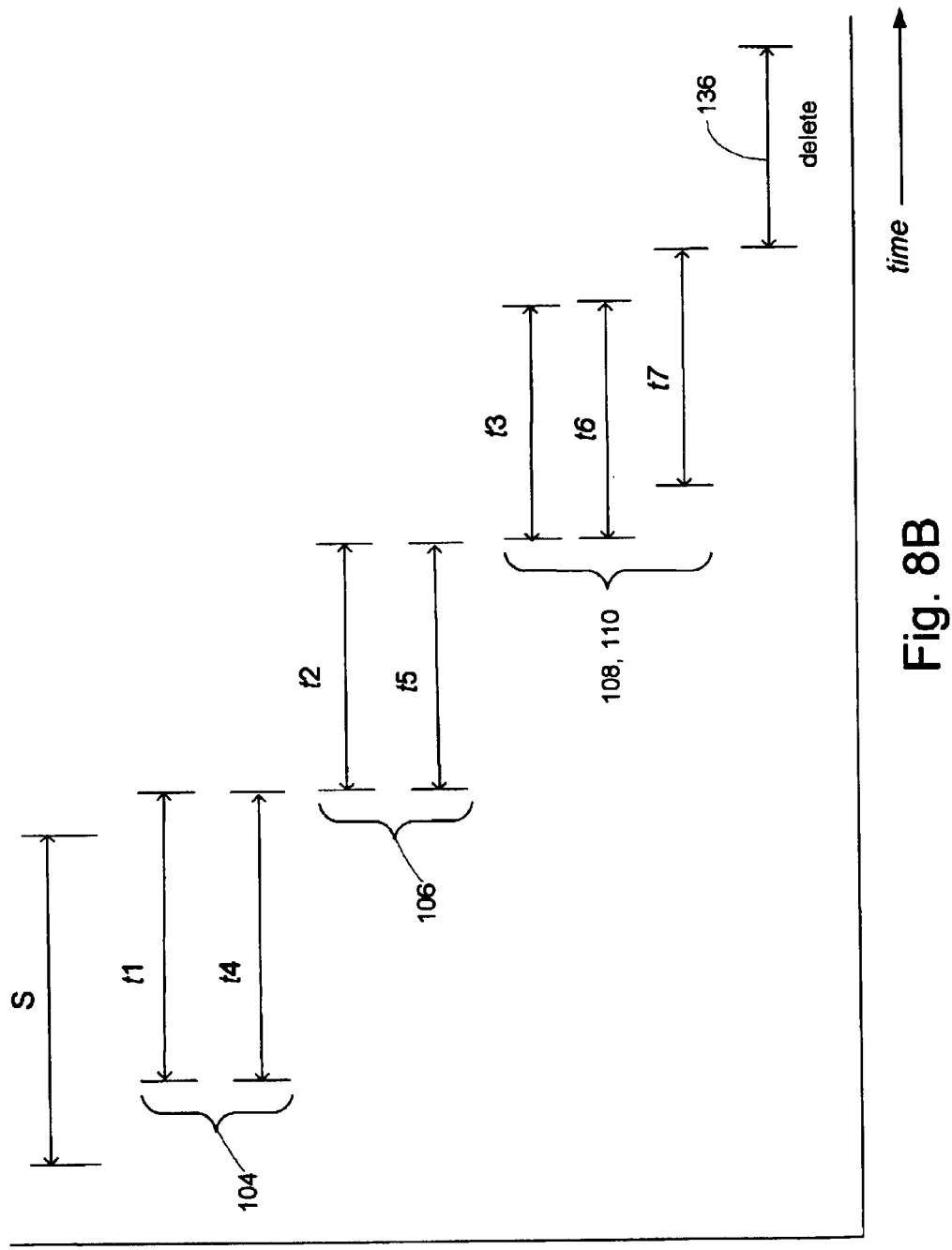
FIG. 8B shows a timing chart for the general execution plan of FIG. 8A.

A deletion operator D 136 is connected to the rest of the tree via op10, an ordered union operator. The deletion operate clears the accumulated rows in the temporary table when the execution of the rest of the plan is completed The execution plan of FIG. 8A clearly creates efficient execution of the triggers involved. Triggers that can execute in parallel do so and those having conflicts with other triggers execute in the order of their creation time stamp. FIG. 8B illustrates the concurrency in execution caused by the given tree of FIG. 8A.

Figure 9A:
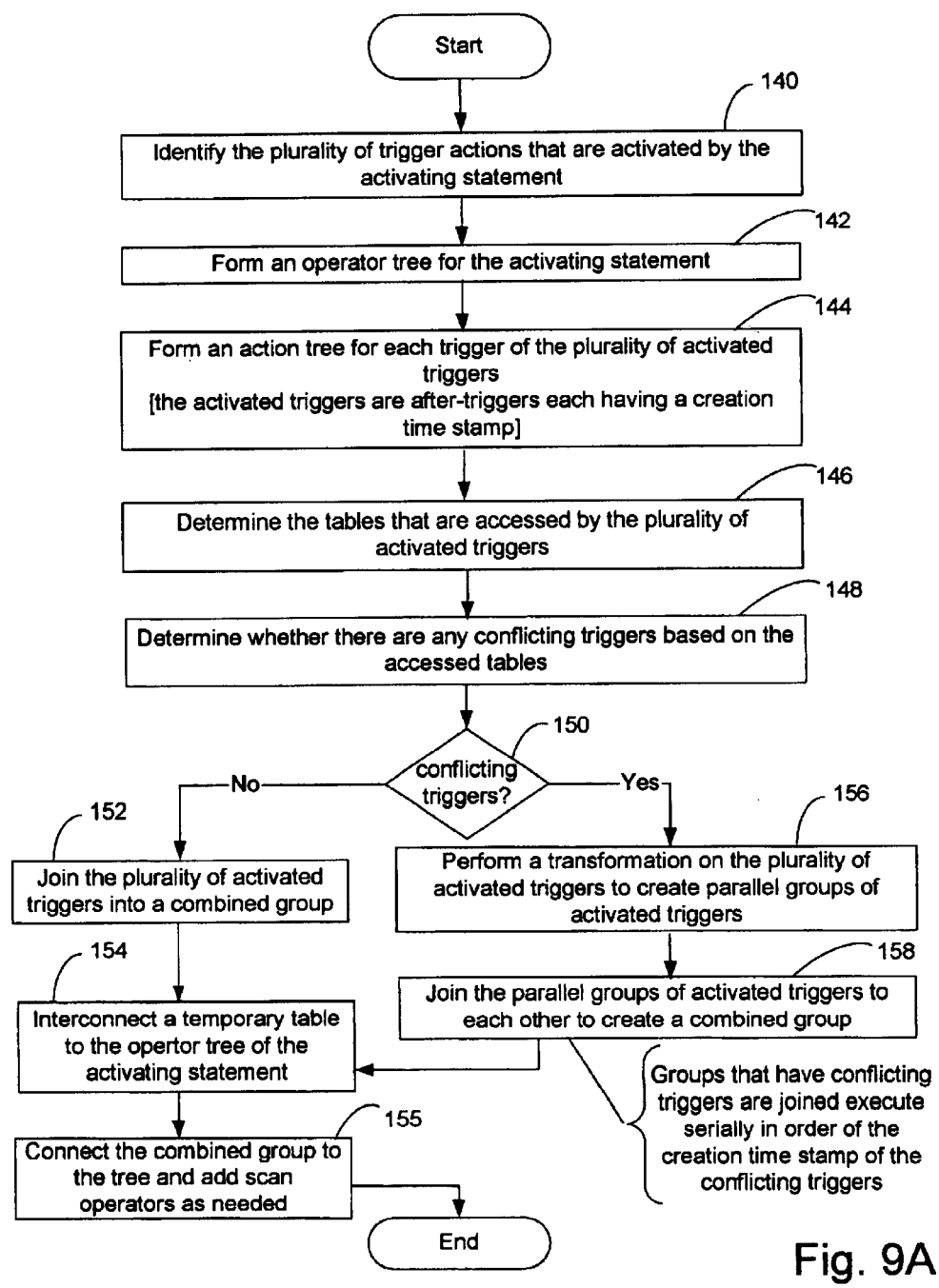
FIG. 9A shows a flow chart for creating an execution plan when there is a possibility of conflicting triggers.
Figure 9B:
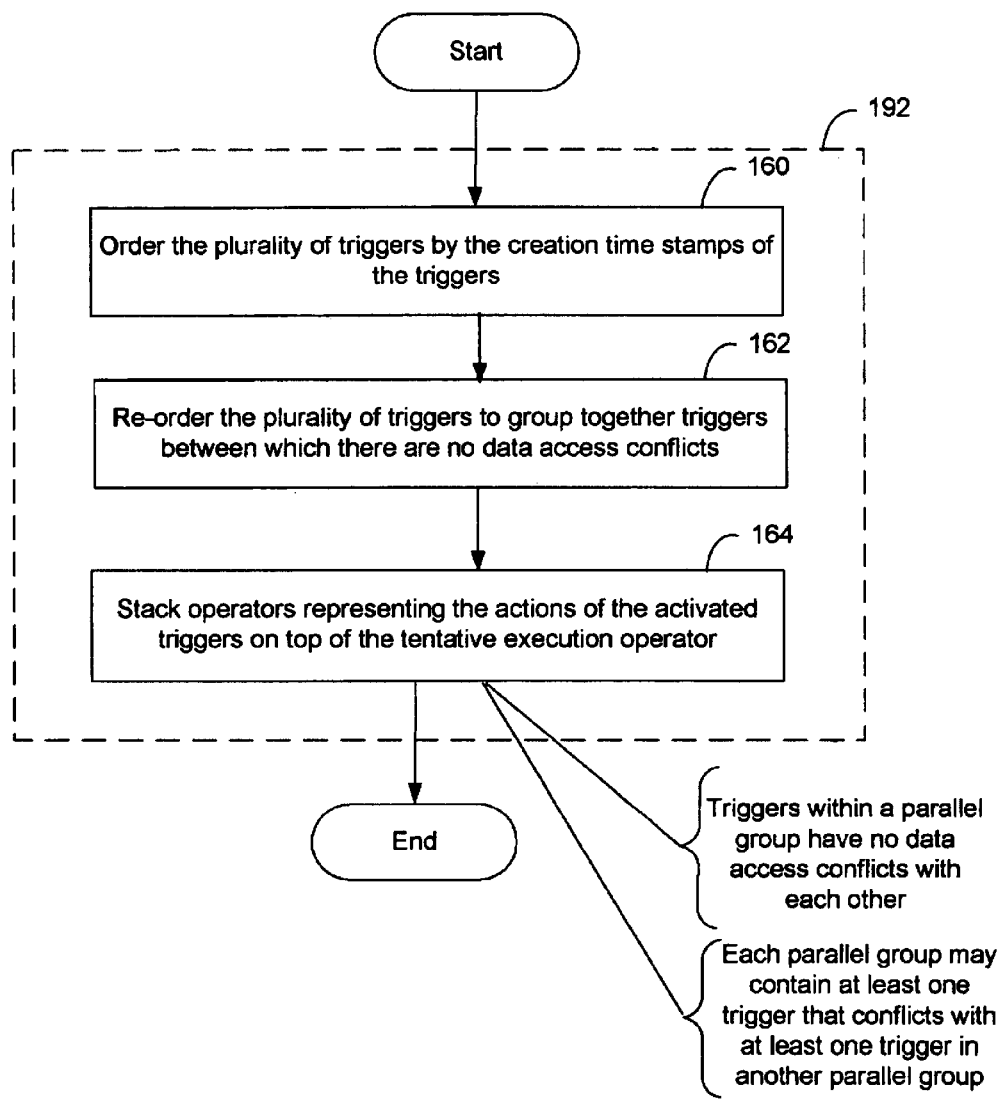
FIG. 9B shows a flow chart for the transformation step of FIG. 8A.

FIGS. 9A and 9B show a flow charts for creating an execution plan when there is a possibility of two or more conflicting triggers.

Referring to FIG. 9A, in step 140, any trigger actions that are activated by the activating statement S are identified. An operator tree, in step 142, for the activating statement is constructed, and in step 144, the an action tree for each activated trigger is constructed. The order of steps 142 and 144 is not critical. Each activated trigger, an after-trigger, has a creation time stamp that indicates when it was created. The creation time stamp is needed in case some of the triggers are determined to be conflicting triggers because these triggers must be executed sequentially in the order in which they were created. In step 146, the tables in the database that are read or written (accessed) by the activated triggers are determined, so that, in step 148, any data access conflicts between the activated triggers can be determined.

If there are no data access conflicts, as determined in step 150, then the activated triggers are combined into a single group, in step 152. A temporary table is interconnected to the operator tree of the activating statement S in step 154, and the combined group is then connected to the resulting tree in step 155. If there are any row triggers in the group, they can be split off from the group and joined with a flow operator so that they can be pipelined with the execution of the operator tree for S, such as is shown in FIG. 6A.

If there are data access conflicts between activated triggers, as determined in step 150, then a transformation step 156 is performed on the activated triggers to create two or more parallel groups of activated triggers, such as those described in reference to FIG. 8A. Parallel groups of triggers, such as p1, p2 and combined group p3/p4 in FIG. 8A, are groups that have no conflicts among triggers within the group so that the triggers in the group execute in parallel with each other but have conflicts between two or more triggers within the groups. It should be noted that a conflict can exist not only among triggers of the same type (row or statement triggers) if there is a data access conflict, but a conflict can also exist between triggers of different types and between a statement trigger and the activating statement as well. In step 158, the parallel groups of triggers are joined to each other so that groups are configured execute serially relative to each other, in the order of the creation time stamp of the conflicting trigger within the parallel group. Thus, in FIG. 8A, p2 executes after p1, and p3 after p2. The serial execution of groups is enforced via ordered union operators, op3, op5 and op7 of FIG. 8A. The flow of FIG. 9A and the resulting plan in FIG. 8A substantially reduce execution time while preserving the order of triggers that conflict with each other to be the order in which those triggers were created.

FIG. 9B shows the transformation step 156 in more detail. In step 160, the activated triggers are ordered by their creation time stamps and, in step 162, the activated triggers are re-ordered to juxtapose, where possible, triggers between which there are no data access conflicts. Referring to FIG. 8A, the creation time stamp of triggers t1–t7 is the order of the subscripts. After reordering, the triggers have the following order: t1, t4, t2, t5, t3, t6, t7. This re-ordering facilitates the identification of a possible row trigger group that can be connected for pipelined execution with the operator tree. In FIG. 8A, if triggers t1 and t4 are row triggers, then can be connected for pipelined execution with the operator tree, if op3 is a flow operator and op2 is a parallel union operator (flow operator op1 for the temporary table does not interfere with flow operator op3). In step 164, the re-ordered triggers are then separated into a plurality of groups, p1, p2, and p3 as shown in FIG. 8A, given the assumed conflicts.

Figure 10A:
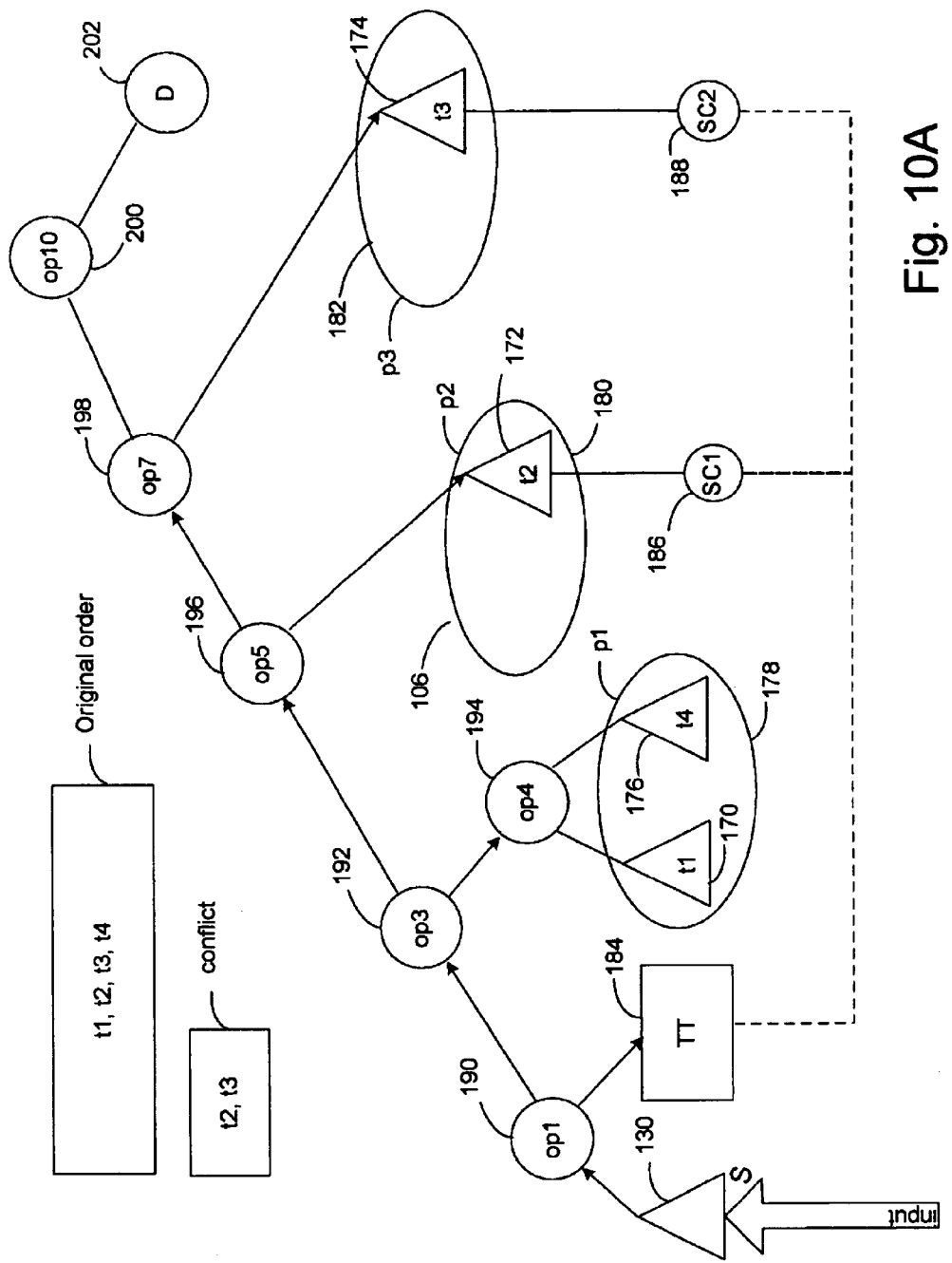
FIG. 10A shows an execution plan in which a temporary table and scan operator are employed in a conflict between statement triggers.

FIG. 10A shows a specific execution plan, created in accordance with the process of FIGS. 9A and 9B, in which a temporary table and scan operator are employed when there are conflicting statement triggers. According to FIG. 10A, there are four triggers, t1 170, t2 172, t3 174, and t4 176, three groups, p1 178, p2 180 and p3 182, a temporary table TT 184, two scan operators sc1 186 and sc2 188, six operators op1 190, op3 192, op4 194, op5 196, op7 198, op8 200 and a deletion operator 202. Triggers t1–t4 are assumed to have creation time stamps in the order of their subscripts. Temporary table TT is present to accumulate rows processed by the operator tree of the activating statement S so that statement (or row) triggers can have access to the processed rows. Scan operators sc1 and sc2 are used to read the temporary table and provide input the statement trigger. A deletion operator 202 for clearing the temporary table is interconnected to op7 via an ordered union operator op8, so that when of all of the operations in the execution plan are completed the deletion operator clears the temporary table. This deletion operator D is connected to an execution plan any time a temporary table is employed.

In FIG. 10A, group p1 is assumed to contain two row triggers t1 and t4 that can execute in parallel, so this group is connected to the operator tree of the activating statement by a flow operator. Groups p2 and p3 are assumed to each contain statement triggers t2 and t3 between which there is a conflict. Because of the conflict, parallel groups p2 and p3 must execute sequentially so they are connected to each other by an ordered union operator op7. Group p2 must be interconnected via an ordered union operator op5 for execution subsequent to the execution of group p1 and the operator tree for statement S, because statement-after trigger t2 conflicts with the execution activating statement S.

Figure 10B:
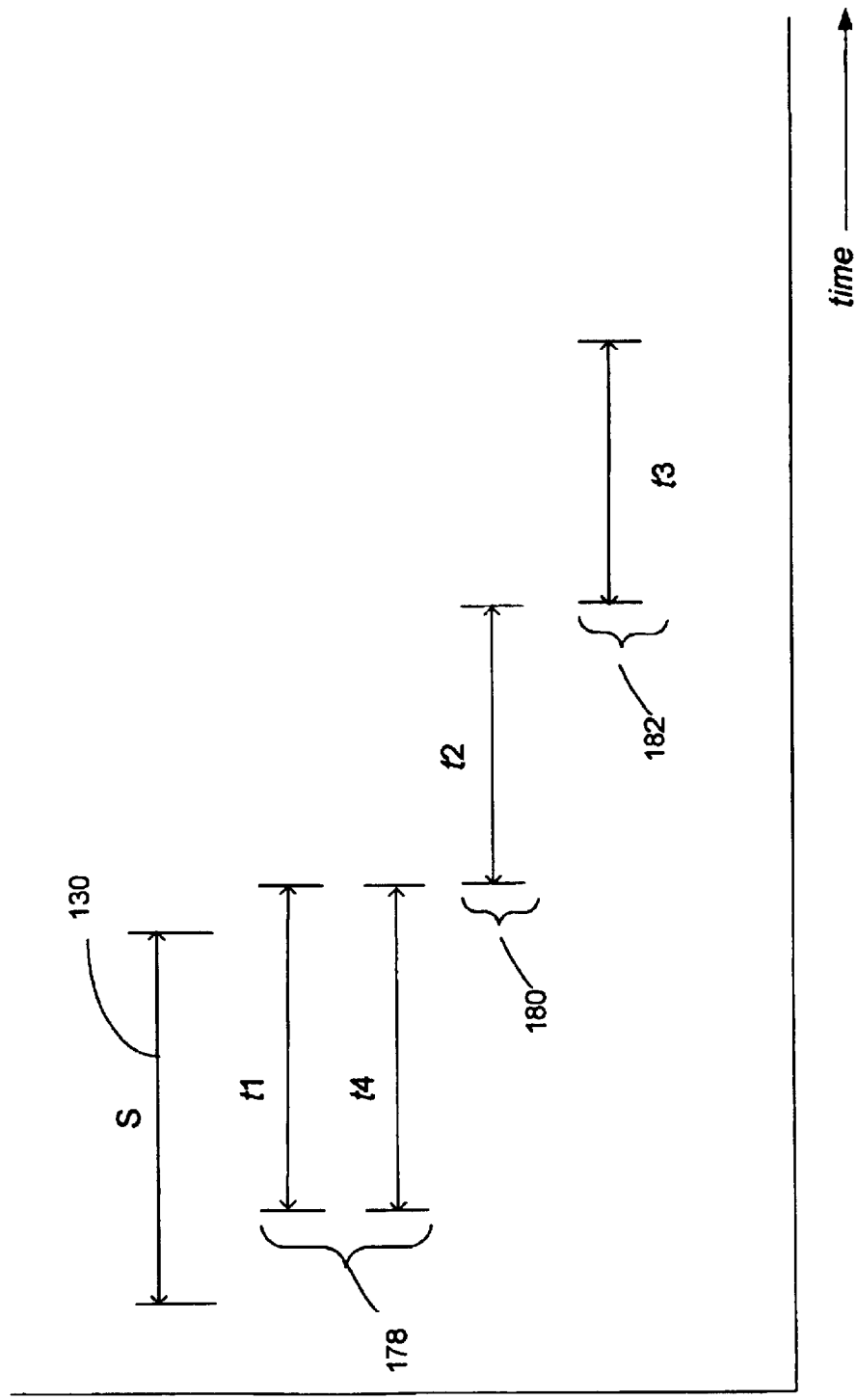
FIG. 10B shows a timing chart for the plan of FIG. 10B.

The time to execute the execution plan of FIG. 10A is summarized in FIG. 10B. According to the figure, row triggers t1 and t4, having been brought forward, are interconnected to execute in parallel with each other and in a pipelined fashion with the execution of the operator tree for the activating statement S. Triggers t2 and t3 execute serially in the order of their creation time stamp because of the conflict. Statement trigger t2 executes after the execution of the operator tree for statement S, because of the inherent conflict of a statement trigger with its activating statement.

Figure 11A:
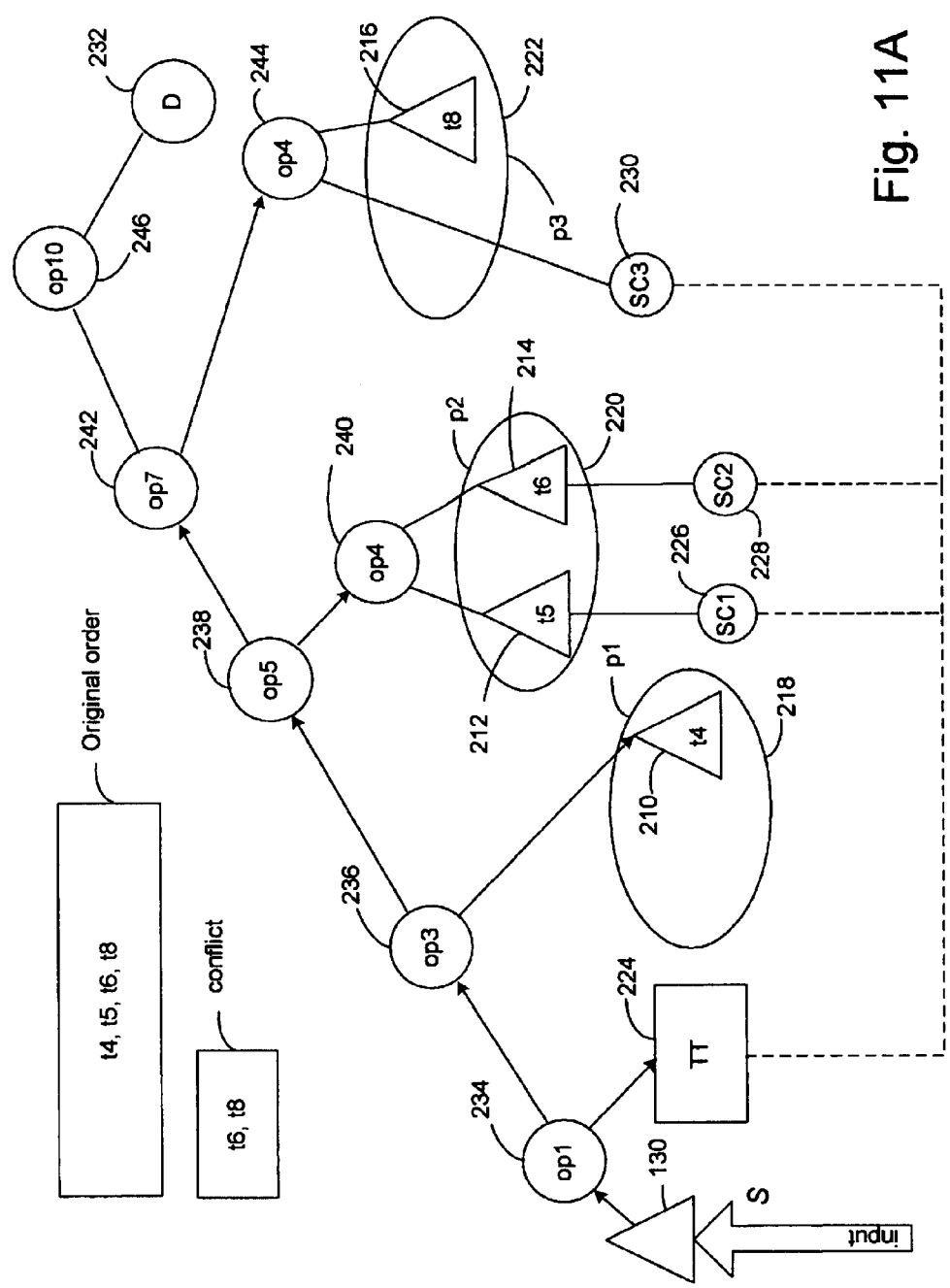
FIG. 11A shows an execution plan in which a temporary table and scan operator are employed in a conflict between a row trigger and a statement trigger.

FIG. 11A shows another specific execution plan, created in accordance with the process of FIGS. 9A and 9B, for the case where there is a conflict between a row trigger and a statement trigger. In the figure, there are four triggers, t4 210, t5 212, t6 214, and t8 216, having a creation time stamp order according to their subscripts, three groups, p1 218, p2 220 and p3 222, a temporary table TT 224, three scan operators sc1 226, sc2 228, sc3 230, a deletion operator 232, and seven operators op1 234, op3 236, op5 238, op6 240, op7 242, op8 244, and op9 246. A deletion operator 232 is connected via op9, an ordered union operator, to clear the TT table when the execution of the plan is completed.

If group p1 in FIG. 11A is assumed to contain a row trigger t4, then op1 can be a flow operator to connect p1 to the operator tree of the activating statement for pipelined execution in accordance with the heuristic of bringing row triggers forward.

Group p2 is assumed to contain statement triggers t5 and t6, between which there are no conflicts. Therefore, triggers t5 and t6 are joined together by op6, which is a parallel union operator and this group is connected to the op3 operator by means of an ordered union operator op5, when op3 is a flow operator to assure that group p2 executes after activating statement S.

Group p3 is assumed to contain a row trigger t8 that conflicts with statement trigger t6 in group p2 so conflicting group p3 must interconnected to group p2 by means of an ordered union operator, op7, in this case.

The temporary table TT is connected to the operator tree for the activating statement S by op1, which is a flow operator, so that the temporary table can accumulate rows as they are produced by the execution of the operator tree. Scan operators, sc1, sc2 and sc3, provide input to statement triggers t5 and t6 and row trigger t8.

Operator op8 is a flow operator that serves to interconnect the row trigger t8 to the scan operator sc3 for pipelined execution with the scan operator sc3.

Figure 11B:
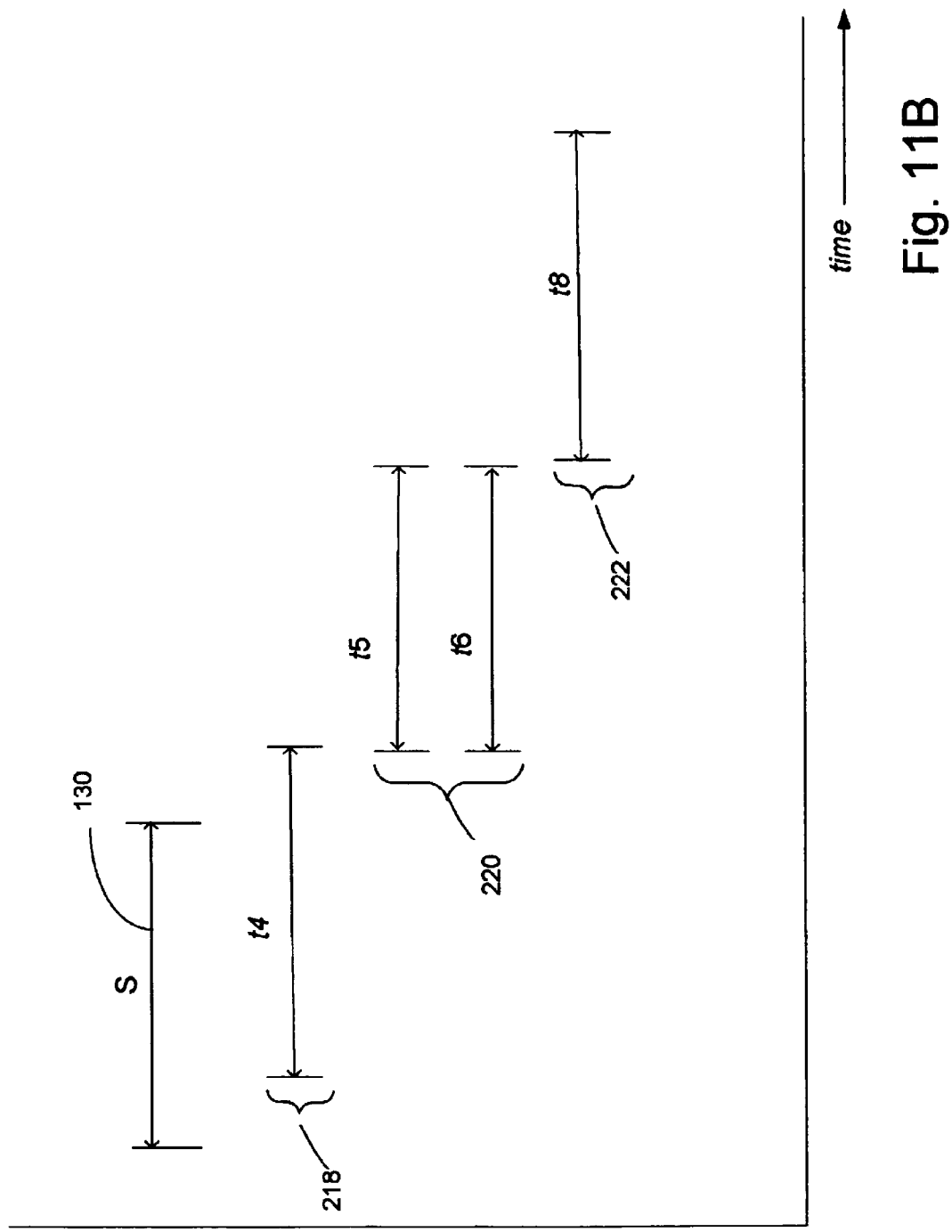
FIG. 11B shows a timing chart for the plan of FIG. 11A.

The time line for the execution of the plan in FIG. 11A is illustrated in FIG. 11B. In the figure, row trigger t4 executes in a pipelined fashion with S, statement triggers t5 and t6 execute in parallel with each other and subsequent to the execution of the activating statement because of the inherent conflict between statement triggers and the activating statement, and row trigger t8 executes after the execution of t5 and t6 is completed, because of the conflict between t8 and t6. Thus, triggers t6 and t8 execute serially in the order of their creation time stamps.

Figure 12A:
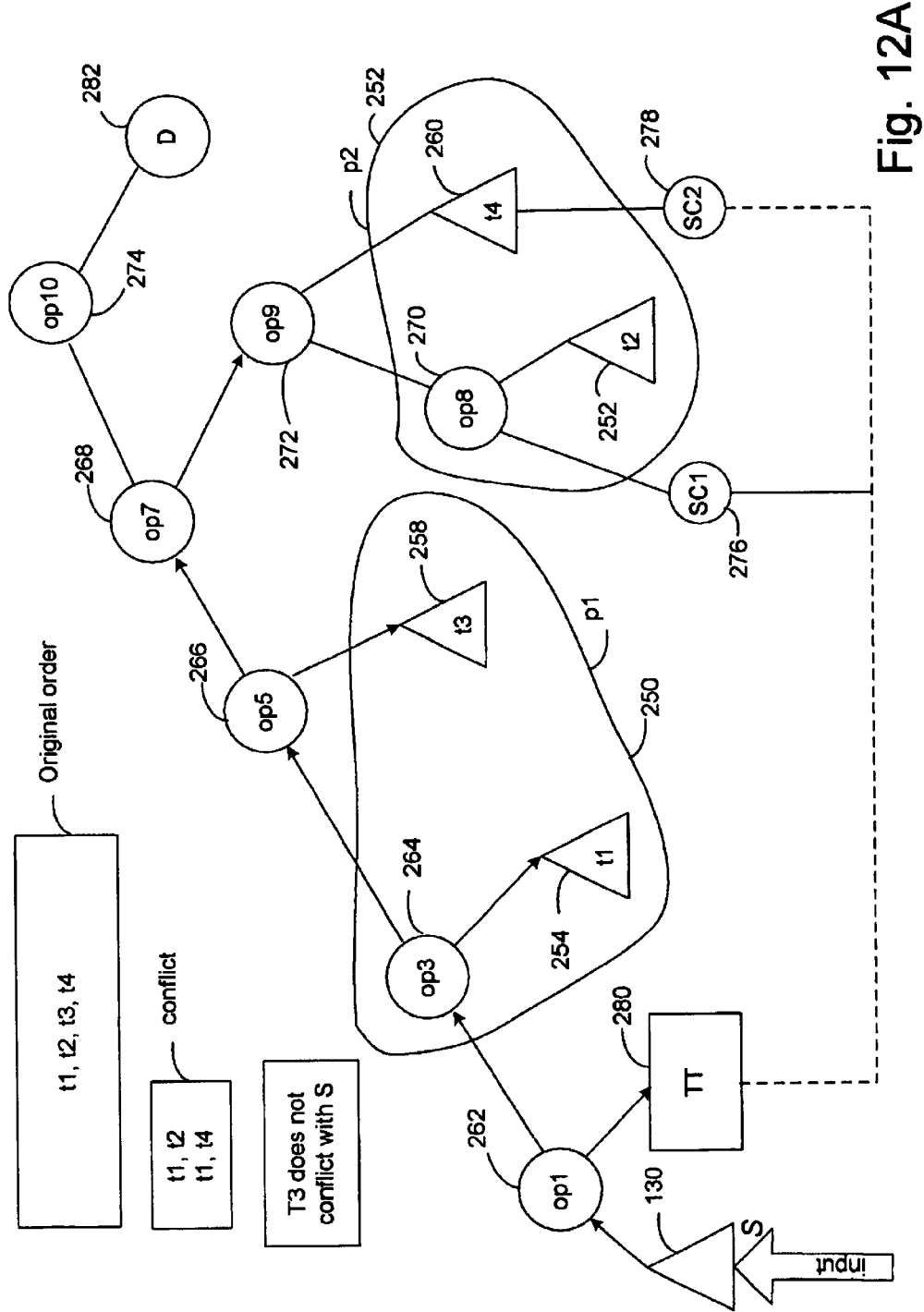
FIG. 12A shows an execution plan that combines a row trigger and statement trigger into effectively the same group.

FIG. 12A shows another specific execution plan, created in accordance with the process of FIGS. 9A and 9B, that combines a row trigger and statement trigger into effectively the same group. There are two groups, p1 250 and p2 252, four triggers t1 254, t2 256, t3 258, t4 260, seven operators, op1 262, op3 264, op5 266, op7 268, op8 270, op9 272, and op10 274 two scan operators, sc1 276 and sc2 278, a temporary table TT 280 and a deletion operator 282. The deletion operator is connected via op10, an ordered union operator, to clear the temporary table TT when the execution of the plan is completed.

Group p1 includes triggers t1, assumed to be a row trigger, and t3, assumed to be a statement trigger, between which there are no conflicts. Furthermore, statement trigger t3 does not conflict with the operator tree for the activating statement S. The triggers of group p1 are joined by a parallel union operator op5. Group p1 also includes a flow operator op3 so that row trigger t1 can execute in a pipelined fashion with its input. Because op1 is a flow operator, this allows trigger t1 to execute in a pipelined fashion with the operator tree for the activating statement S. Thus, t1 executes in a pipelined fashion with the activating statement, and t3 executes in parallel with t1.

Group p2 includes triggers t2, which is assumed to be a row trigger and t4 which is assumed to be a statement trigger. The triggers t2 and t4 are joined by parallel union operator op9. Group p2 also includes a flow operator so that the row trigger can operate in a pipelined fashion with scan operator sc1, which scans temporary table TT for input to the row trigger t2. A second scan operator sc2 provides input for trigger t4 from the temporary table TT.

Because there is a conflict between t1 and t2 and t1 and t4, group p1 must complete execution before the beginning of execution of group p2. This ordering is guaranteed by an ordered union operator op7 which interconnects the parallel union operator op5 for group p1 and the parallel union operator op9 for group p2.

FIG. 12B shows a timing chart for the execution of the timing plan of FIG. 12A. Trigger t1 executes in a pipelined fashion with activating statement S and trigger t3 executes in parallel with trigger t1. After trigger t3 completes its execution, trigger t2 starts. Trigger t4 is depicted as executing in parallel to trigger t2 (because of the parallel union operator op9). As is clear to one skilled in the art, the total execution time for the execution plan of FIG. 12A is substantially reduced from the serial execution of all of the triggers. However, the original order of conflicting triggers is still preserved.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of forming an execution plan for a plurality of triggers in an active database having at least one table, each table having at least one row, comprising:

identifying the plurality of triggers that are activated by the activating statement;

forming an operator tree for the activating statement;

forming a tree for each trigger of the plurality of activated triggers, wherein the activated triggers are after-triggers each having a creation time stamp;

determining the tables that are accessed by the plurality of activated triggers;

determining any conflicting triggers based on the tables accessed by the activated triggers;

separating the activated triggers into at least two parallel groups including a first group and a second group, each group containing at least one trigger that conflicts with at least one trigger in another group; and interconnecting the parallel groups of triggers to the operator tree for the activating statement such that the parallel groups execute in the order of the creation time stamp of the at least one conflicting trigger contained therein.

2. A method of forming an execution plan as recited in claim 1, wherein the first parallel group is a row-after trigger group; and wherein the step of interconnecting the parallel groups includes interconnecting the row-after trigger group to execute in a pipelined fashion with the operator tree of the activating statement.

3. A method of forming an execution plan for a plurality of triggers in an active database having at least one table, each table having at least one row, comprising:

identifying the plurality of triggers that are activated by the activating statement;

forming an operator tree for the activating statement;

forming a tree for each trigger of the plurality of activated triggers, wherein the activated triggers are after-triggers each having a creation time stamp;

determining the tables that are accessed by the plurality of activated triggers;

determining whether there are any conflicting triggers based on the accessed tables;

if there are conflicting triggers, performing a transformation on the plurality of activated triggers to create at least two parallel groups, including a first and second group, of activated triggers such that triggers in each group do not conflict with each other and can execute in parallel; and joining the parallel groups of activated triggers to each other to create a combined group, such that parallel groups having conflicting triggers execute serially in order of the creation time stamp of the conflicting triggers; and if there are no conflicting triggers, joining the plurality of activated triggers into a combined group; and connecting the combined group to the operator tree.

4. A method of forming an execution plan as recited in claim 3, further including, when there are no conflicting triggers, splitting the combined group into a first group containing row triggers and a second group containing statement triggers; and wherein the connecting step includes, when there are no conflicting triggers:

connecting the first group for pipelined execution with the execution of the operator tree; and connecting the second group for execution subsequent to the execution of the operator tree.

5. A method of forming an execution plan as recited in claim 4, wherein the step of connecting the first group for pipelined execution with the execution of the operator tree comprises interconnecting a flow operator between the first group and the operator tree.

6. A method of forming an execution plan as recited in claim 4, wherein the step of connecting the second group for execution subsequent to the execution of the operator tree comprises interconnecting an ordered union operator between the second group and the first group.

7. A method of forming an execution plan as recited in claim 3, wherein, when there are conflicting triggers, the joining step includes interconnecting ordered union operators between the parallel groups having conflicting triggers to enforce serial execution between the conflicting groups.

8. A method of forming an execution plan as recited in claim 3, wherein, when there are conflicting triggers and the first parallel group of activated triggers includes row triggers, the connecting step includes connecting the first parallel group for pipelined execution with the operator tree.

9. A method of forming an execution plan as recited in claim 7, wherein the step of connecting the first parallel group for pipelined execution with the operator tree comprises interconnecting a flow operator between the operator tree and the first parallel group.

10. A method of forming an execution plan as recited in claim 3, wherein, when there are conflicting triggers, and the first parallel group of activated triggers includes statement triggers, which have no conflict with the activating statement, the connecting step includes connecting the first parallel group for parallel execution with the operator tree.

11. A method of forming an execution plan as recited in claim 10, wherein the step of connecting the first group for parallel execution with the operator tree includes connecting a parallel union operator between the first group and the activating statement.

12. A method of forming an execution plan as recited in claim 3, wherein the step of performing a transformation includes:

ordering the plurality of triggers by the creation time stamps of the triggers;

re-ordering the plurality of triggers to juxtapose those triggers between which there are no data access conflicts; and separating the re-ordered and juxtaposed triggers into the plurality of parallel groups, wherein triggers within a parallel group have no data access conflicts with each other and wherein each parallel group contains at least one trigger that conflicts with at least one trigger in another parallel group.

13. A method of forming an execution plan as recited in claim 12, wherein the re-ordering step includes grouping row-after triggers together; and wherein the connecting step includes, when there are conflicting triggers, connecting the row-after trigger group to the operator tree for pipelined execution, if the row triggers are in the first parallel group.

14. A method of forming an execution plan as recited in claim 12, wherein the step of connecting the row-after trigger group to the operator tree for pipelined execution comprises interconnecting a flow operator between the row-after trigger group and the operator tree.

15. A method of forming an execution plan as recited in claim 12, wherein the first parallel group contains at least one row-after trigger.

16. A method of forming an execution plan as recited in claim 12, wherein first parallel group contains at least one statement-after trigger that does not conflict with the activating statement.

17. A method of forming an execution plan as recited in claim 12, wherein the first parallel group contains at least one row-after trigger and at least one statement-after trigger that does not conflict with the activating statement.

* * * * *